United States Patent
Fischer

(10) Patent No.: US 6,460,913 B2
(45) Date of Patent: Oct. 8, 2002

(54) VEHICLE ROOF ADJUSTABLE BETWEEN A CLOSED POSITION AND A FOLDED POSITION

(75) Inventor: Thomas Fischer, Tübingen (DE)

(73) Assignee: CTS Fahrzeug Dachsysteme GmbH, Korntal-Münchingen (DE)

( * ) Notice: Subject to any disclaimer, the term of this patent is extended or adjusted under 35 U.S.C. 154(b) by 0 days.

(21) Appl. No.: 09/750,177

(22) Filed: Dec. 29, 2000

(65) Prior Publication Data

US 2001/0026077 A1 Oct. 4, 2001

(30) Foreign Application Priority Data

Dec. 29, 1999 (DE) .......................... 199 63 640

(51) Int. Cl.[7] .................................................. B60J 7/00
(52) U.S. Cl. .......................... 296/107.12; 296/107.08; 296/107.09
(58) Field of Search ...................... 296/136, 107.08, 296/107.09, 107.12

(56) References Cited

U.S. PATENT DOCUMENTS 5,267,769 A    12/1993  Bonné et al. ............... 296/107
5,267,770 A  * 12/1993  Orth et al. .............. 296/107.12

FOREIGN PATENT DOCUMENTS

| DE | 41 23 516   | 7/1992  |
| DE | 295 10 117  | 10/1995 |
| DE | 196 10 969  | 9/1997  |
| DE | 197 14 106  | 10/1998 |
| DE | 198 27 796  | 1/1999  |
| DE | 197 37 031  | 3/1999  |
| DE | 198 08 588  | 9/1999  |
| EP | 0 974 480   | 1/2000  |

* cited by examiner

Primary Examiner—Joseph D. Pape
(74) Attorney, Agent, or Firm—Crowell & Moring LLP

(57) ABSTRACT

An adjustable vehicle roof has an adjustable folding top between a closed position and a folded position with a convertible top rod assembly and a top cover material. At least one rod component of the convertible top rod assembly is lowerable into a stowing compartment in the folded position via an adjustment kinematic. In a space conserving embodiment, this rod component is moved along the path of a pitch circle during transport into the stowing compartment.

6 Claims, 3 Drawing Sheets

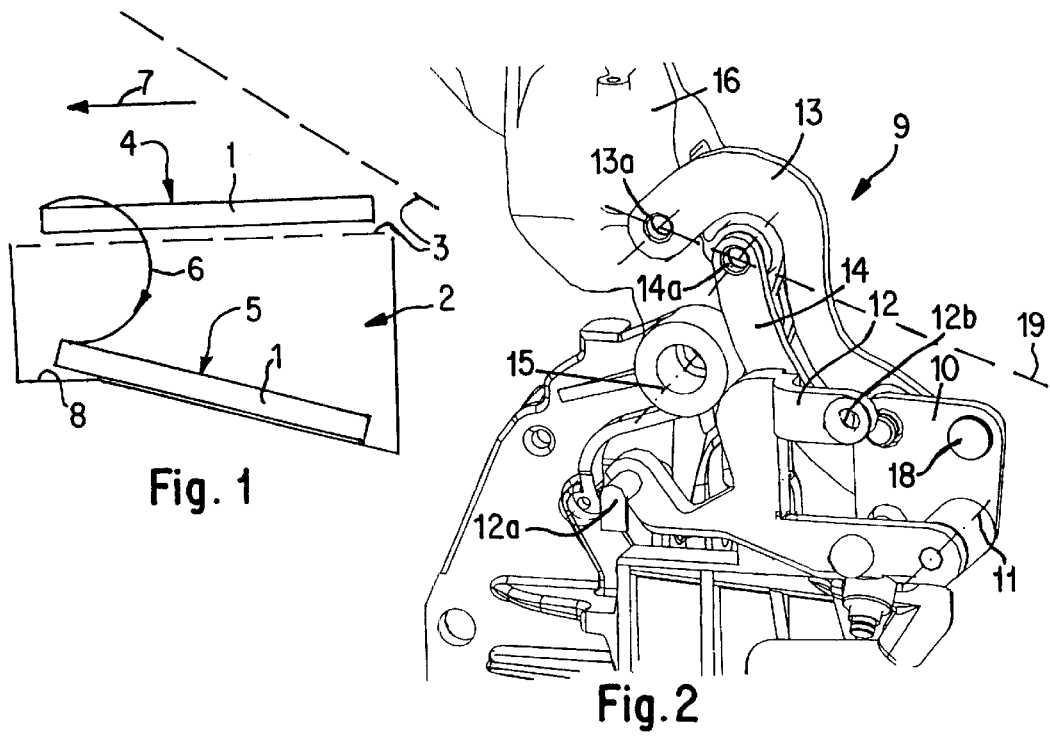
Fig. 1
Fig. 2
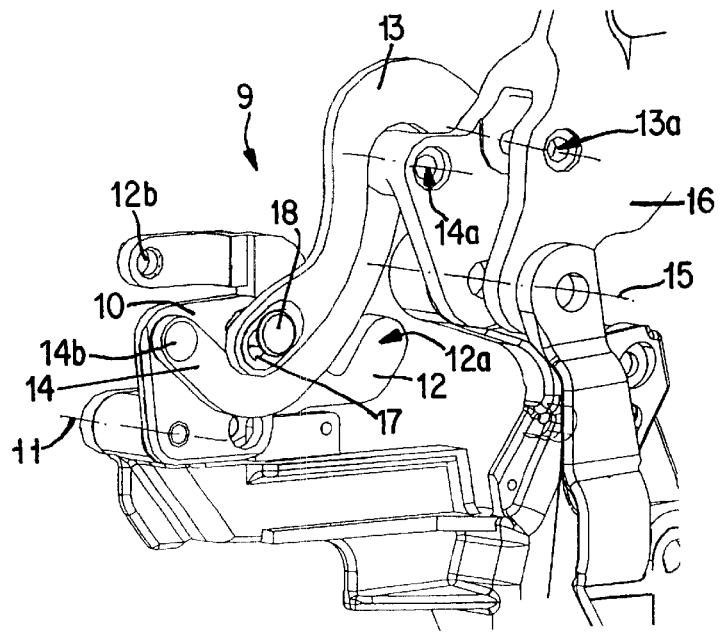
Fig. 3

VEHICLE ROOF ADJUSTABLE BETWEEN A CLOSED POSITION AND A FOLDED POSITION

BACKGROUND OF THE INVENTION

This application claims the priority of 199 63 640.00, filed Dec. 29, 1999, the disclosure of which is expressly incorporated by reference herein.

The present invention relates to a vehicle roof that is adjustable between a closed position and a folded position with a convertible top rod assembly and a canopy cover material, a cover material retainer that, in its closed position of the folding top rests on a rear component at the side of the car body and that introduces stretch in the canopy cover material through an adjustable kinematics that is lowerable into a stowing compartment, whereby the material retainer bracket at the link to the adjustable kinematic is pivot-mounted and during transport into the stowing compartment makes the movement of a pitch circle.

DE 41 23 516 C1 describes a vehicle roof that has a folding cover with an adjustable convertible top rod assembly in which a material covers the convertible top rod assembly, is stretched by a material retainer bracket in the closed position of the canopy, is a part of the convertible top rod assembly and is in the rear area of the convertible top rod assembly. The material retainer bracket stretches the material and brings about a smooth outer pane on account of which wind resistance and wind noise are reduced. In the closed position, the material retainer bracket rests on a cover which closes a stowing compartment in which the folding roof is stowed away in the folded position.

So that the folding canopy top can be transported to the folded position, it is necessary that the material retainer bracket first swivel up to make room for the opening movement of the canopy top stowing compartment cover. After the cover is opened, the stowing compartment can be accessed and the folding canopy top can be lowered into the stowing compartment.

During the lowering motion into the stowing compartment, the adjustable kinematics of the folding canopy must lie outside of the movement track of the convertible top rod assembly and the material cover to avoid collisions.

This requires smallish adjustment kinematics, which must, however, be sufficiently large in dimension at the same time in order to bring about the necessary force for the adjustment movements.

In order to keep the stowing area as small as possible, the canopy top must also have a compact folded volume. This places, in particular in relation to the material retainer bracket which moves in the opposite direction to the canopy top during the folding motion, high requirements with respect to the adjustable kinematics with a simultaneous folded volume that is as small as possible.

The seminal DE 198 27 796 A1 describes an adjustable vehicle roof which demonstrates an adjustable folding canopy top that is adjustable between a closed position and a folded position which indicates a canopy top material cover. In the closed position, the canopy top material cover of the folding roof is stretched by a material retainer bracket that rests on a car body component in the rear. The material retainer bracket hangs on a primary roof arch of the convertible top rod assembly and is swivel-mounted opposite of it. The main roof arch is maintained slewable at a console of the vehicle body so that, during the transport of the folding roof from closed position to folded position, the rest point of the material retainer bracket makes a pitch circle movement at the main roof arch in the direction of the stowing compartment.

In order to ensure that the material retainer bracket in the closed position has a sufficiently high stretch capacity that stretches the folding canopy top material cover without separating from the car body in the back, the material retainer bracket must be locked or must be secured with a control element with retention force. In any event, an additional component is required which must be operated in addition to the adjustment kinematics.

SUMMARY OF THE INVENTION

An object of the present invention is to provide an adjustable vehicle roof with a compact folded volume.

This object has been achieved, in accordance with the invention, by providing that the adjustable linkage is a four-bar linkage with a strap down swivelling axle swivel-mounted, the retainer bracket is connected to a base plate and two articulated levers acting upon the base plate, and the two levers pass through a top dead center position during transport between the closed position and the folded position.

The present invention provides that at least one component of the convertible top rod assembly of the vehicle roof performs a pitch circular motion while being moved into the stowing compartment. The pitch circle motion offers, in contrast to a swivelling motion around a strap-down swivelling axle the advantage, that the rod component is swivelled along its entire length in the direction of the base of the stowing compartment and can be deposited on it to avoid unusable areas in the folded position in the stacking compartment.

Further, the pitch circle motion has the advantage that, during the lowering into the stowing compartment, the rod component makes a motion related to strap-down coordination system with mixed repeater and rotary sliding motion. Thereby the repeater component of the rod assembly component is first guided away from the neighboring wall section in the first segment of the slide-over motion, and in the second segment of the slide-over motion it again approaches the stowing wall. Consequently, an adjustment kinematic or linkage that is fixed in stationary position can be used to overlap settling or similar components during transporting to the folded position and to avoid collisions during the folding motion.

The component that makes the pitch circle motion is the material retainer bracket which is placed in the rear area of the convertible top rod assembly and which is, in the closed position, advantageously positioned on top of the canopy box cover of the stowing compartment. Because the material retainer bracket is usually that component which, in the closed position is that part of the convertible top rod assembly which extends furthest over the rear vehicle area, the transport into the stowing area via a pitch circle motion is advantageous and makes possible optimal use of space in the stowing compartment.

It could also be advantageous, if appropriate, to lower alternative or additional components to the material retainer bracket of the convertible top rod assembly into the stowing compartment on a pitch circle track. If necessary, the entire folding canopy top can make a pitch circle motion during the transporting from the closed position to the folded position.

The adjustment kinematic or linkage which imparts the pitch circle motion to the component is structured as a four-bar linkage and has a strap-down swivelling axle, swivel-mounted supporting plate on which the component to be pivoted is anchored, as well as two, articulated catching levers connected to the supporting plate, through which the motion is introduced. During transport from the closed position to the folded position, the two levers cross through a top dead center position to ensure that the rod component to be transported remains in a rest position in the closed position as well as in the folded position. In order to ensure that the adjustment kinematic or linkage can overcome the top dead center position, one of the levers is appropriately structured as a link motion lever, one end of which is carried in a special oblong hole link. As the top dead center position is passed the link motion lever can ride along the crank, whereby blocking can be avoided.

The two levers of the adjustment linkage or kinematic are advantageously connected with an adjustable hoop of the vehicle roof with the result that a motion of the vehicle roof causes an adjustment motion of the adjustment kinematic. Thereby, a kinematic coupling between the motion of the vehicle roof and the motion of the component on the circular track is achieved. A common actuator for the entire vehicle roof is sufficient, whereby the motion of the vehicle roof over the adjustment kinematic is transformed into the pitch-circular transporting motion.

BRIEF DESCRIPTION OF THE DRAWINGS

Other objects, advantages and novel features of the present invention will become apparent from the following detailed description of the invention when considered in conjunction with the accompanying drawings.

FIG. 1 is a schematic view of the pitch circular track of a cover material retainer to be lowered into the stowing compartment of an adjustable roof for a vehicle;

FIG. 2 is a perspective of an adjustment kinematic or linkage via which the cover material retainer is to be pivoted into the stowage compartment, shown in the closed position of the vehicle roof;

FIG. 3 is a view of the adjustment kinematic or linkage in the closed position of the roof viewed, however, from another angle;

DETAILED DESCRIPTION OF THE DRAWINGS

Figure 4:
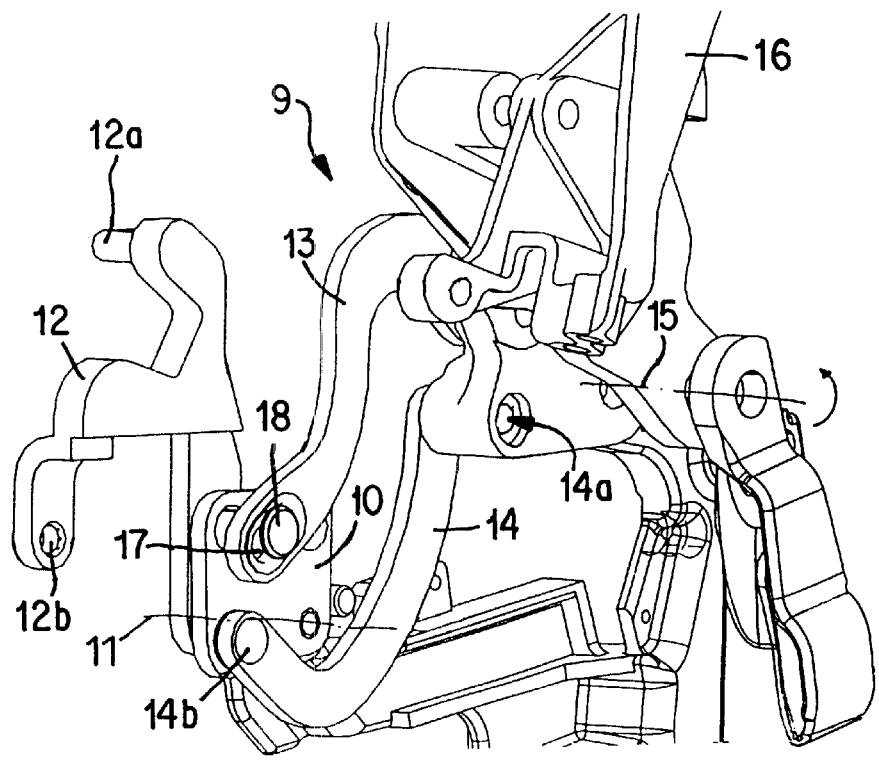
FIG. 4 is a view of the adjustment kinematic or linkage in an in-between position between the closed and folded positions of the roof.

In the following detailed description, the same components are used in the several figures with the same reference numerals.

Schematic FIG. 1 shows a material retainer bracket 1 which is a part of a vehicle roof that is adjustable between the closed position and the folded position. The material retainer bracket 1 is in the rear portion of the vehicle roof top which is constructed as a folding top of a vehicle and stretches, in the closed position of the roof, the roof top cover material which is carried by a convertible top rod assembly of the folding top. In the closed position, as indicated at numeral 4, the material retainer bracket 1 rests on a folding top box lid 3 of a locked stowing compartment 2 which is intended for receiving the folding top in the folded position as indicated at numeral 5. During the transport motion of the folding top from the closed position to the folded position, the folding top box cover 3 swivels to an open position in order to allow a lowering of the folding top into the stowing compartment 2. After the folding of the folding top, the folding top box cover 3 is returned to a covering position shown by the dash line in the horizontal position.

In order to guarantee optimal use of the stowing compartment and beyond that, to ensure that components of the vehicle roof and other strap-down components which are positioned in the area of the stowing compartment 2 on the side which is facing the vehicle front do not collide with the motion track of the material retainer bracket 1 during the transporting motion of the roof, the material retainer bracket 1 is transported on a pitch circle track 6 in the direction of the arrow in FIG. 1 from the closed position 4 to the folded position 5 with adjustable kinematics or linkage that is not shown in FIG. 1. During the transport from closed position 4 into folding position 5 on the pitched circle track 6, the material retainer bracket 1, in addition to the rotary component of the motion track 6, first moves against the vehicle front 7 towards the back and in the further course again back in the direction of the vehicle front 7. The material retainer bracket 1 thus moves at about a half circle.

In the folded position 5, the material retainer bracket 1 occupies its lowest position and rests on the bottom 8 of the stowing compartment 2.

FIGS. 2 to 7 show the adjustable kinematics or linkage 9 which is, by way of the material retainer bracket 1, adjustable between the closed position and the folded position on its pitch circle track. The adjustable kinematics or linkage 9 is constructed as a four-bar linkage and includes a base plate 10, which is swivel-mounted around a strap-down swivelling axle 11, as well as two levers 13, 14 that are slewably connected with the base plate 10 and are coupled in an end area thereof that is opposite to the base plate 10, above turning point center 13a, 14a, slewable with a component constructed as a roof frame 16 component of the folding roof.

The roof frame 16 demonstrates a strap-down swivelling axle 15, the motion of the roof frame 16 during the transport between a closed position and a folded position being accomplished via known adjusting elements (not shown). The roof frame 16 functions as an adjustable linkage 9 control element in that, during the swivelling motion of the roof frame 16 around its strap-down swivelling axle 15, hinge points 13a, 14a of lever the 13 or 14 of the adjustment linkage or kinematics 9 can also be moved on a circular track around the swivelling axle 15. The motion that is forced upon levers 13, 14 is transferred to the base plate 10 which makes a swivelling motion around its strap-down pivoting axle 11.

The base plate 10 carries a swivel lever 12 with torsional strength that is connected with base plate 10 which, in an area of an end opposite to base plate 10, shows a connecting piece 12a as well a turning point center 12b which are both connected with the material retainer bracket 1. Because of the coupling with torsional strength between the base plate 10 and the swivel lever 12, the connection piece 12a and the turning point center 12b carry out a circular-type motion around the strap-down swivelling axle 11 of base plate 10 during the transport between the closed position and the folded position. This circular-type motion corresponds to a pitched circle with which the material retainer bracket 1 is transported from the closed position to the folded position and vice versa.

In an alternate embodiment, the adjustable linkage or kinematics 9 can be controlled via a stand-alone adjusting element which is independent from the folding top. The coordination of the movement of the folding top and the adjustable linkage or kinematics which impinge upon the material retainer bracket 1 is, in this alternative embodiment, brought about by coordinated adjustment movements of the respective adjustment elements.

As can be seen in FIGS. 3 to 7, the lever 13 is constructed as a link motion lever that, in its front area directed towards base the plate 10, has a connecting member 17 which, in particular, is constructed as an oblong hole. The second lever 14 is a control lever and is articulatingly connected with the base plate 10 via the turning point center 14b.

Figure 5:
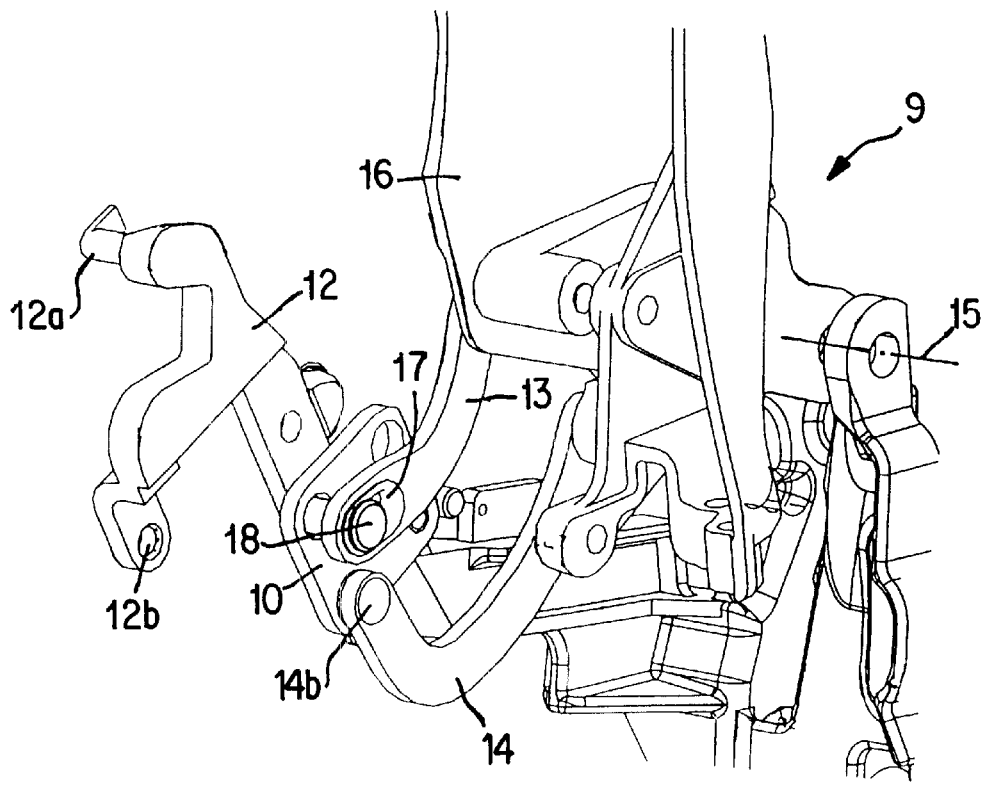
FIG. 5 is a view of the adjustment kinematic or linkage in another position, nearer to the folded position, shown in top dead center position.
Figure 6:
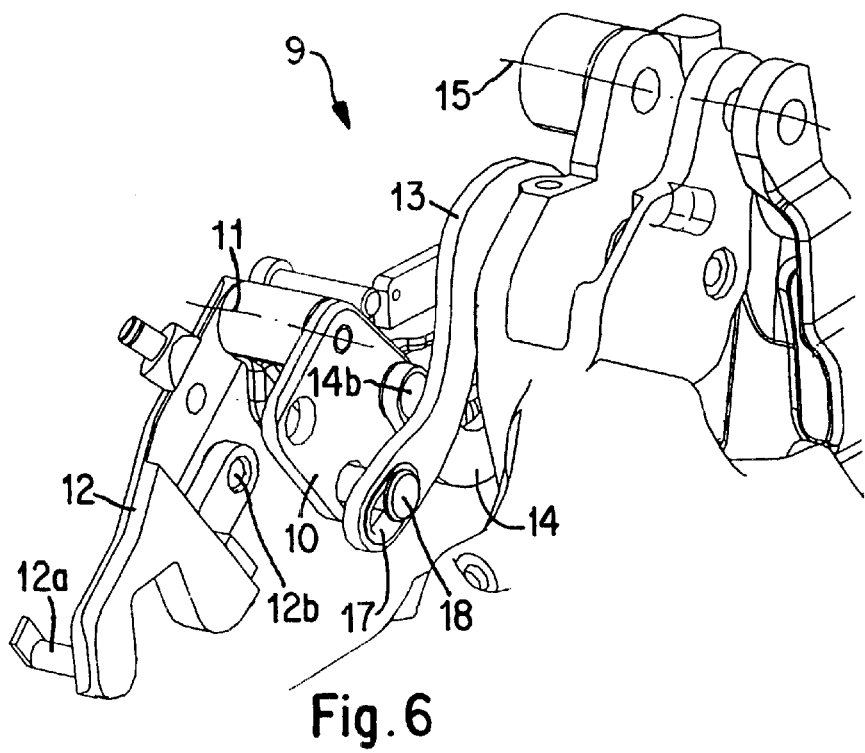
FIG. 6 is a view of the adjustment kinematic or linkage in closed position.
Figure 7:
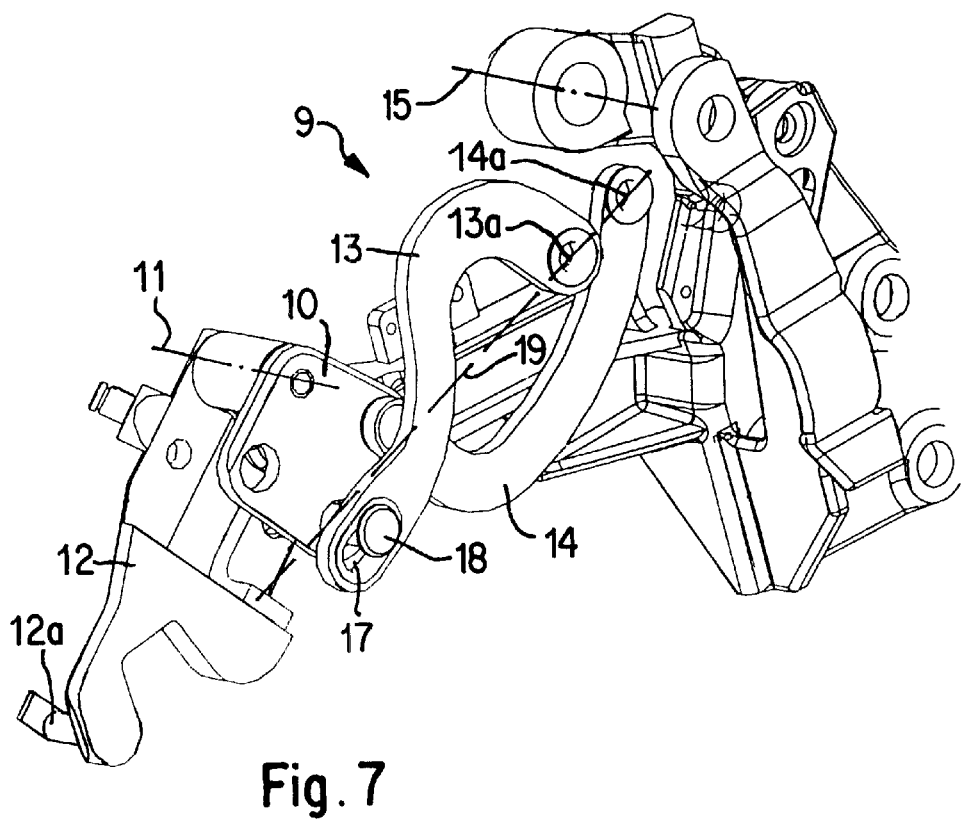
FIG. 7 is a view of the adjustment kinematic or linkage in folded position in a partially sectional view.

In the connecting member 17 of the link motion lever 13, a guided pin 18 is fixedly connected with the base plate 10 which can, during the transport of the variable kinematics or linkage 9 between the closed position and the folded position in the connecting member 17, slide along and, additionally, permit torsion of the link motion lever 13 opposite the base plate 10. In particular, position displacement of the pin 18 in the connecting member 17 of the link motion lever 13 is required in order to overcome the top dead center position of the adjustable kinematics or linkage 9. This top dead center position is shown in FIG. 5 and distinguishes itself with a stop position of the pin 18 in the connecting member 17 in the area of the outer section of the facing surface of the link motion lever 13. This comes about because, during transport from the closed position to the folded position, the hinge points 13a, 14a of the two levers 13, 14 on the roof frame 16 are in a connecting line 19 with the pin 18 in the connecting member 17. The connecting line 19 is shown in FIGS. 2 and 7.

During transport of the adjustable kinematics or linkage 9 from the closed position shown in FIG. 2 to the folded position in FIG. 7, the pin 18 is adjusted in the connecting member 17 of the link motion lever 13 out of a position under the connection line 19 into a position of or above the connection line and thereafter again into a position below the connection line 19. In the closed position as well as in the folded position, the pin 18 is in a surface-side stop position in the connecting member 17, which is the top dead center position as shown in FIG. 5, and lies opposite a neighboring position of the free end of the link motion lever 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustable vehicle roof having a canopy cover material and an adjustable folding top movable between a closed position and a folded position, comprising a cover material retainer bracket which, in the closed position, rests on a rear component at a vehicle body side and introduces stretch into the canopy cover material through an adjustable linkage that is lowerable into a stowing compartment of the vehicle body, the material retainer bracket at a link to the adjustable linkage being pivot-mounted and, during transport into the stowing compartment, having a pitch circle movement, wherein the adjustable linkage is a four-bar linkage with a strap-down swivelling axle swivel-mounted at a base plate, the cover material retainer bracket is connected to the base plate, and two articulated levers act upon the base plate and pass through a top dead center position during transport between the closed position and the folded position.

2. The adjustable vehicle roof according to claim 1, wherein one of the two articulated levers is a link motion lever, the base plate has a pin, and one end of the link motion lever has a connecting member in which the pin of the base plate is guided and is configured to assume opposite positions in the top dead center position and outside of the top dead center position.

3. The adjustable vehicle roof according to claim 1, wherein the two articulated levers have ends opposite to the base plate, and hingedly connected with the vehicle roof.

4. The adjustable vehicle roof according to claim 3, wherein the hinged connection is arranged slewably in a strap-down swivelling axle.

5. The adjustable vehicle roof according to claim 3, wherein that the hinged connection is in a roof frame.

6. The adjustable vehicle roof according to claim 1, wherein the cover material retainer bracket is slewably arranged around a lateral axle transverse to a longitudinal axle of the vehicle.

* * * * *